(12) United States Patent
Van Raepenbusch et al.

(10) Patent No.: US 12,291,102 B2
(45) Date of Patent: *May 6, 2025

(54) PUMP ASSEMBLY IN A TRANSMISSION AND PUMP ASSEMBLY OPERATING METHOD

(71) Applicant: Dana Belgium N.V., Flanders (BE)

(72) Inventors: Filip Van Raepenbusch, Bruges (BE); Kurt Cattoor, Koolkerke (BE)

(73) Assignee: DANA BELGIUM N.V., Bruges (BE)

( * ) Notice: Subject to any disclaimer, the term of this patent is extended or adjusted under 35 U.S.C. 154(b) by 0 days.

This patent is subject to a terminal disclaimer.

(21) Appl. No.: 18/411,548

(22) Filed: Jan. 12, 2024

(65) Prior Publication Data

US 2024/0239179 A1 Jul. 18, 2024

Related U.S. Application Data

(60) Provisional application No. 63/480,142, filed on Jan. 17, 2023.

(51) Int. Cl.
*B60K 6/383* (2007.10)
*B60K 6/40* (2007.10)
*B60K 6/48* (2007.10)

(52) U.S. Cl.
CPC ............... *B60K 6/48* (2013.01); *B60K 6/383* (2013.01); *B60K 6/40* (2013.01)

(58) Field of Classification Search
CPC ............. B60K 6/48; B60K 6/383; B60K 6/40
See application file for complete search history.

(56) References Cited

U.S. PATENT DOCUMENTS

| | | | |
|---|---|---|---|
| 4,667,767 A * | 5/1987 | Shea ................. | B60K 17/3505 |
| | | | 192/85.48 |
| 8,733,191 B2 | 5/2014 | Oliver | |
| 9,327,728 B2 | 5/2016 | Gibson et al. | |
| 9,434,252 B2 | 9/2016 | Heindl | |
| 9,541,147 B2 | 1/2017 | Isoda et al. | |
| 10,336,187 B2 * | 7/2019 | Horsfall ................. | B60K 25/06 |
| 2012/0277060 A1 * | 11/2012 | Kubo .................. | F16H 57/0439 |
| | | | 180/65.265 |
| 2013/0065719 A1 * | 3/2013 | Schenker ............ | F16H 57/0439 |
| | | | 475/8 |
| 2018/0112740 A1 * | 4/2018 | Matsumoto ......... | F16H 55/0806 |
| 2018/0178779 A1 * | 6/2018 | Inagawa ............... | B60W 20/40 |
| 2020/0324755 A1 * | 10/2020 | Lahr ........................ | B60K 6/48 |
| 2022/0364517 A1 * | 11/2022 | Baret ....................... | F02C 7/32 |
| 2024/0174079 A1 * | 5/2024 | Zhao ........................ | F16H 3/10 |

* cited by examiner

*Primary Examiner* — Edwin A Young
(74) *Attorney, Agent, or Firm* — McCoy Russell LLP

(57) ABSTRACT

Systems and methods are provided for a mechanical system for a transmission. In one example, the mechanical system in a transmission of a vehicle, comprising: a first one-way clutch included in a first gear combination that is rotationally coupled to an output shaft and to a pump shaft; and a second one-way clutch included in a second gear combination that is arranged parallel to the first gear combination, the second gear combination also rotationally coupled to the output shaft and to the pump shaft; wherein the first and the second gear combinations have an unequal number of gears.

20 Claims, 5 Drawing Sheets

PUMP ASSEMBLY IN A TRANSMISSION AND PUMP ASSEMBLY OPERATING METHOD

CROSS-REFERENCE TO RELATED APPLICATIONS

The present application claims priority to U.S. Provisional Application No. 63/480,142 entitled "PUMP ASSEMBLY IN A TRANSMISSION AND PUMP ASSEMBLY OPERATING METHOD", filed Jan. 17, 2023. The entire contents of the above identified application are hereby incorporated by reference for all purposes

TECHNICAL FIELD

The present disclosure relates to a transmission with a mechanical assembly that is configured for bi-directional inputs.

BACKGROUND AND SUMMARY

Transmissions have been deployed in certain vehicles due to their increased responsiveness and gains in prime mover operating efficiency that the transmission affords. Moreover, certain drivelines make use of electric or hydraulic motors that can easily provide forward drive and reverse drive rotational inputs to the transmission, enabling the vehicle to be effectively switched between forward and reverse drive. The bi-directional motor rotation presents barriers to the use of power take-off (PTO) systems which drive auxiliaries in the driveline, as well as pump systems for providing lubrication to components of the driveline when the driveline is not powered, particularly in pump systems that demand uni-directional rotational input.

Some attempts have been made to provide PTO functionality into certain vehicle systems. For instance, U.S. Pat. No. 10,336,187 B2 in which Horsfall et al. disclose a planetary power take-off device for a vehicle transmission. The power take-off device includes a clutch and a brake unit that enable the ratio of the power take off device to be altered to expand the device's operating window. Further, Horsfall's device is configured to drive an output shaft in both forward and reverse directions.

The inventors have recognized several drawbacks with Horsfall's device as well as other previous PTO devices. For instance, Horsfall's device may be bulky, complex, and costly when compared to devices that are not capable of driving the output shaft in both forward and reverse directions. Therefore, Horsfall's device may have limited applicability particularly in space constrained applications. Further, Horsfall's power take-off device may be prone to degradation due to its complexity. Further, if pump systems, or PTO systems incorporating bi-directional pumps, were capable of driving the pump in both forward and reverse directions, the bi-directional pumps may have constrained maximum pressures that are reduced relative to uni-directional pumps. Consequently, the maximum pressure constraints of the bi-directional pump may prevent the pump from hydraulically powering auxiliaries with high pressure demands, such as charging pumps for instance. Further, the use of bi-directional pumps may increase PTO/pump system costs when compared to uni-directional pumps. Other prior PTO systems have made use of additional electric motors which drive a PTO pump. The extra motor adds cost and complexity to the PTO system.

The inventors have recognized the aforementioned issues and developed a mechanical assembly to at least partially overcome the aforementioned challenges. In one example, the mechanical assembly includes a mechanical system in a transmission of a vehicle, comprising: a first one-way clutch included in a first gear combination that is rotationally coupled to an output shaft and to a pump shaft; and a second one-way clutch included in a second gear combination that is arranged parallel to the first gear combination, the second gear combination also rotationally coupled to the output shaft and to the pump shaft; wherein the first and the second gear combinations have an unequal number of gears.

The mechanical assembly may be a pump assembly having a first one-way clutch configured to engage with an output shaft when the output rotates in a first direction. The pump assembly further includes a second one-way clutch configured to engage with the output shaft when the output shaft rotates in second direction which is opposite the first direction. The pump assembly further includes a first gearset or combination that rotationally couples the first one-way clutch to the output shaft and a second gearset or combination that rotationally couples the second one-way clutch to the output shaft. The one-way clutches in conjunction with the gearsets allow a pump of the pump assembly to be uni-directionally driven when the output shaft rotates in both clockwise and counterclockwise directions. In another example, the first and second gearsets may include an inequivalent number of gears to allow the pump to receive a uni-directional input when the output shaft rotates in either a forward drive direction and a reverse drive direction. As a result, a variety of pump types may be used in the pump assembly when the pump assembly is not powered by a prime mover, such as during towing operations of a vehicle or machine.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
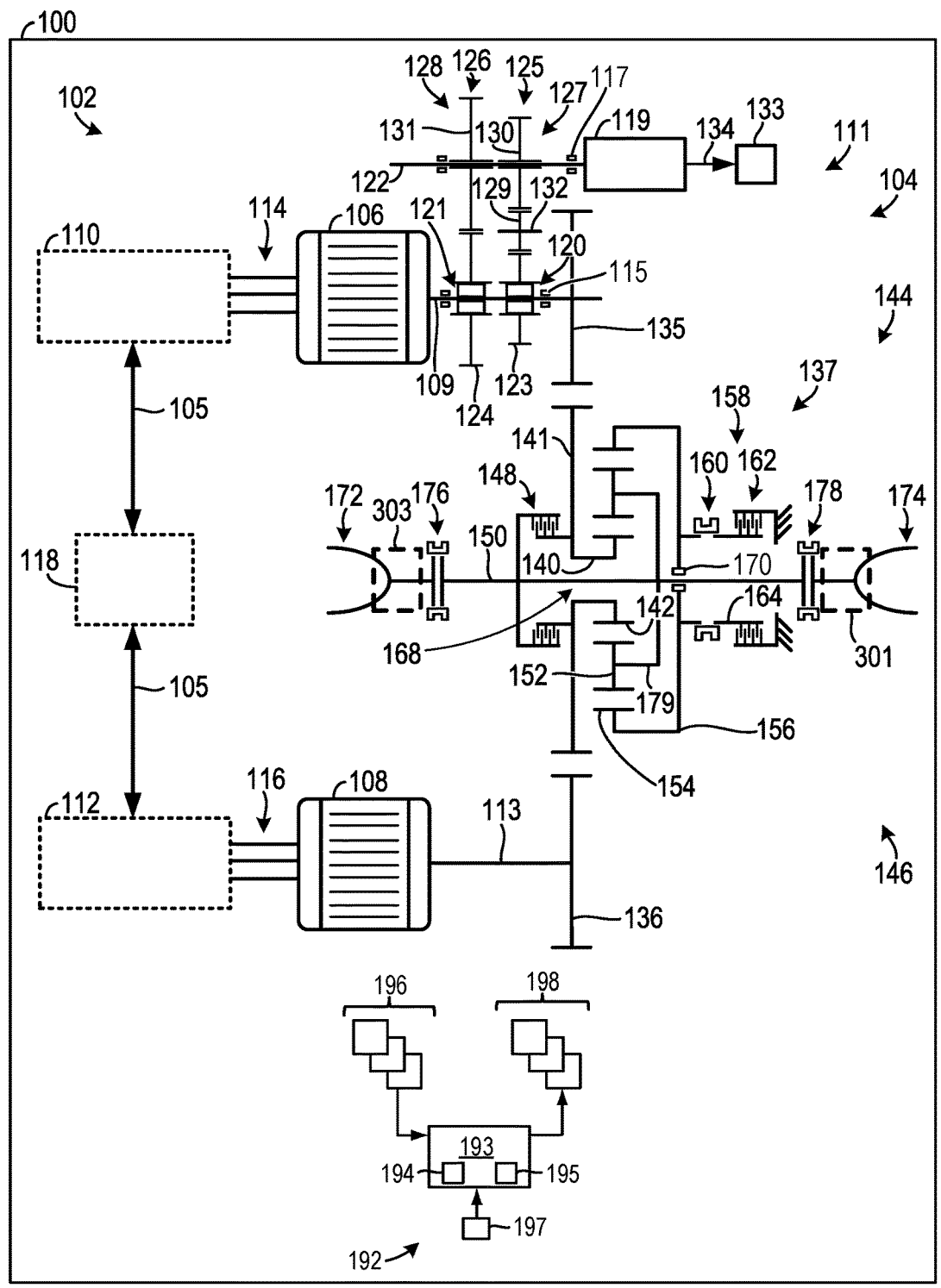
FIG. 1 shows a portion of a vehicle with a transmission that includes a power take-off (PTO) assembly and/or a pump assembly.

A power take-off (PTO) assembly is provided for a transmission that is capable of delivering a uni-directional input to a PTO device while the prime mover spins in both forward and reverse drive directions. In this way, the PTO assembly's window of operation may be expanded when compared to previous systems that use a clutch to decouple the PTO from the transmission during reverse. Further, the PTO assembly described herein is able to use a uni-directional pump as the PTO device, if so desired. Using a uni-directional pump as opposed to a bi-directional pump decreases the likelihood of PTO assembly degradation and may allow the space efficiency of the assembly to be increased while reducing the cost of the assembly, if desired.

To allow the assembly to provide a uni-directional input to the PTO device, the assembly includes a pair of one-way clutches. One of the one-way clutches is configured to engage a shaft of a prime mover or an output shaft of the PTO assembly when the prime mover rotates in a first direction. Conversely, the other one-way clutch is configured to engage the prime mover shaft or the assembly's output shaft when the prime mover rotates in a second direction. Further, the assembly includes mechanical branches that serves to transfer rotational energy between the first one-way clutch and either the output shaft or the prime mover shaft. However, one of the mechanical branches is configured to change the rotational direction of the rotational energy traveling through the branch. In this way, the PTO device is capable of being driven in a single direction when the prime mover switches rotational directions (e.g., during forward and reverse drive modes). Consequently, the PTO device is able to be continuously driven across a wider range of transmission operating modes when compared to previous PTO systems. Further, complex control strategies that involve disconnecting the output of the prime mover from the transmission to enable the transmission to be driven in reverse while the PTO is operated may be avoided, if desired.

In addition, the transmission may further include a pump assembly with a similar two-clutch system as relied upon by the PTO assembly. The pump assembly may allow a pump to provide lubrication to wet clutches of the transmission even during vehicle modes where the prime mover is not supplying power to facilitate movement of the transmission. For example, during towing operations, the prime mover may be deactivated but rotation of the transmission may be compelled. In the absence of lubrication, the clutches may become degraded during rotation of the transmission. One approach to provide lubrication to the transmission during towing operations includes adding a lubrication circuit that relies on a pump driven by the output shaft of the transmission. To enable operation in both forward and reverse towing directions, a bi-directional pump may be demanded, which may be costly and constrained with respect to available pump dimensions.

Alternatively, as described herein, various types of pumps, including uni-directional, pumps, fixed pumps, variable displacement pumps, and other readily available pumps, may be used to continuously lubricate the transmission during non-powered rotation (e.g., not powered by the prime mover) of the transmission by coupling the pair of one-way clutches described above to an extended output shaft of the transmission. The transmission may rotate in either the forward or reverse directions but the pump may be driven uniformly in a single direction. In this way, the pump may draw lubricant from a sump of the transmission and deliver the oil to lubrication channels of the transmission regardless of a rotational direction of the output shaft.

Figure 2A:
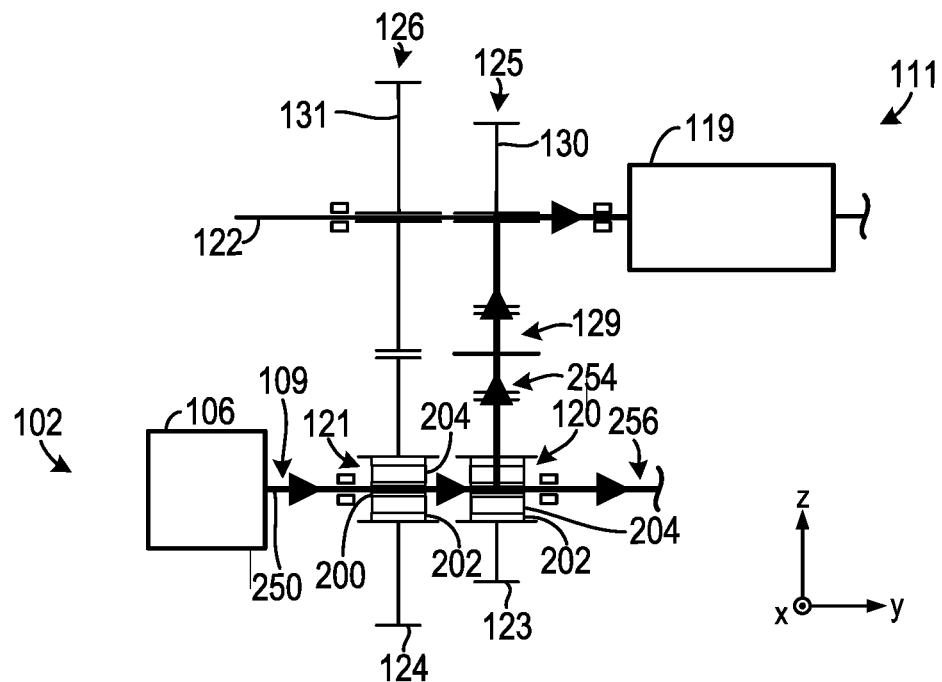
FIGS. 2A-2B show the power paths through the PTO assembly, as depicted in FIG. 1, while the prime mover spins in opposing directions.
Figure 2B:
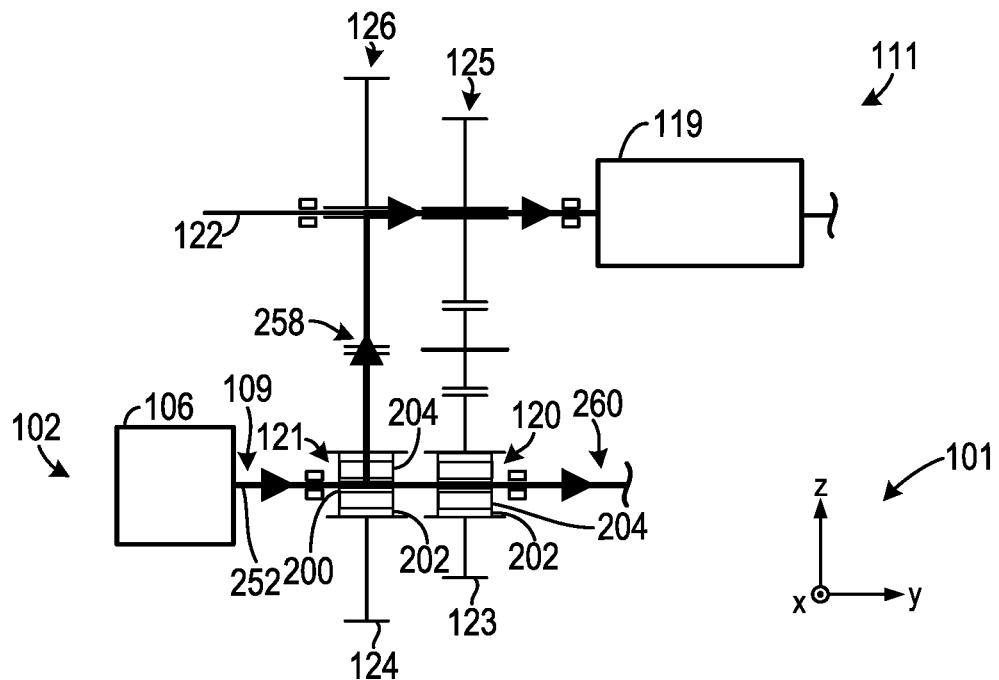
Figure 3:
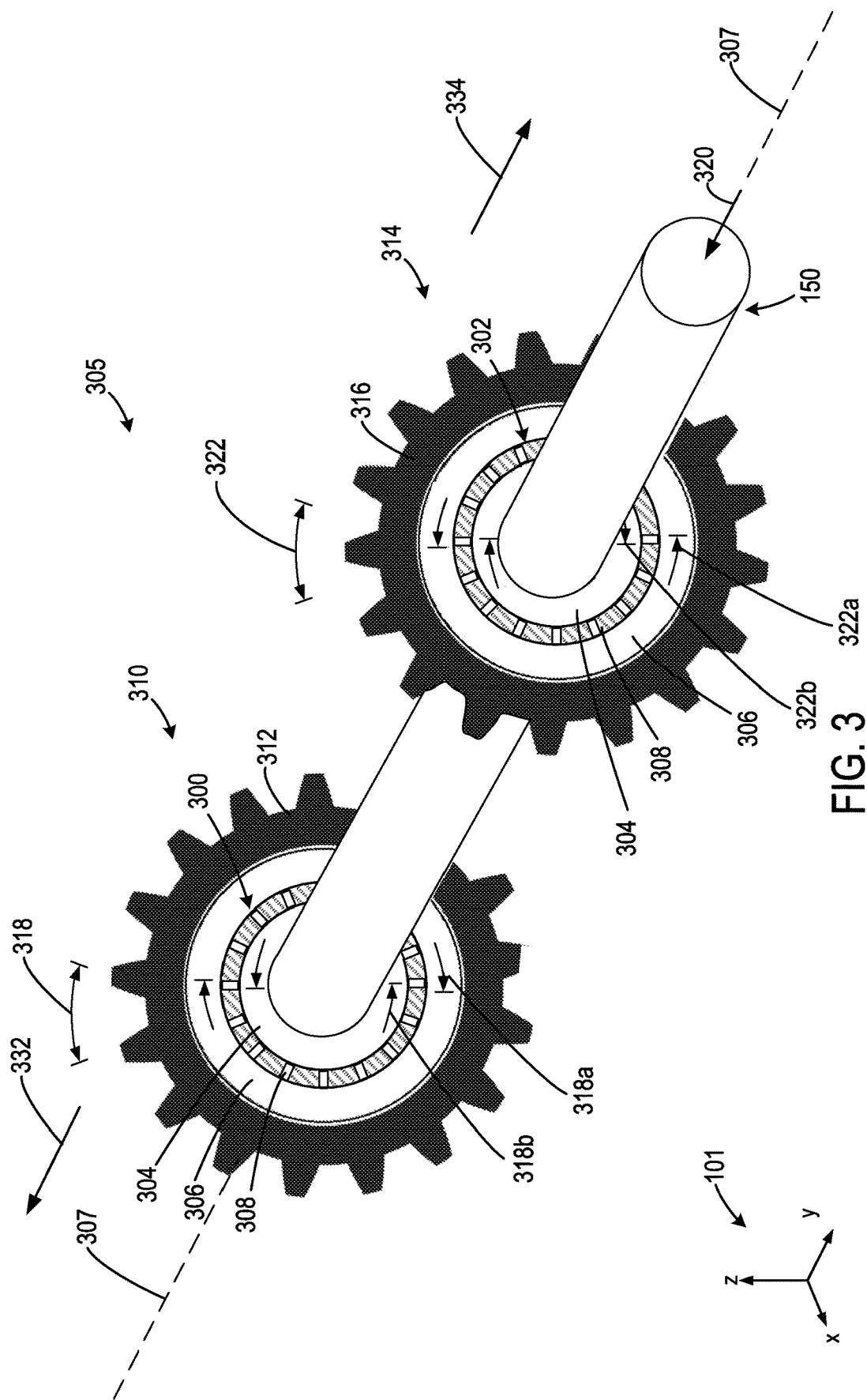
FIG. 3 shows a configuration of one-way clutches included in the pump assembly indicated in FIG. 1.
Figure 4:
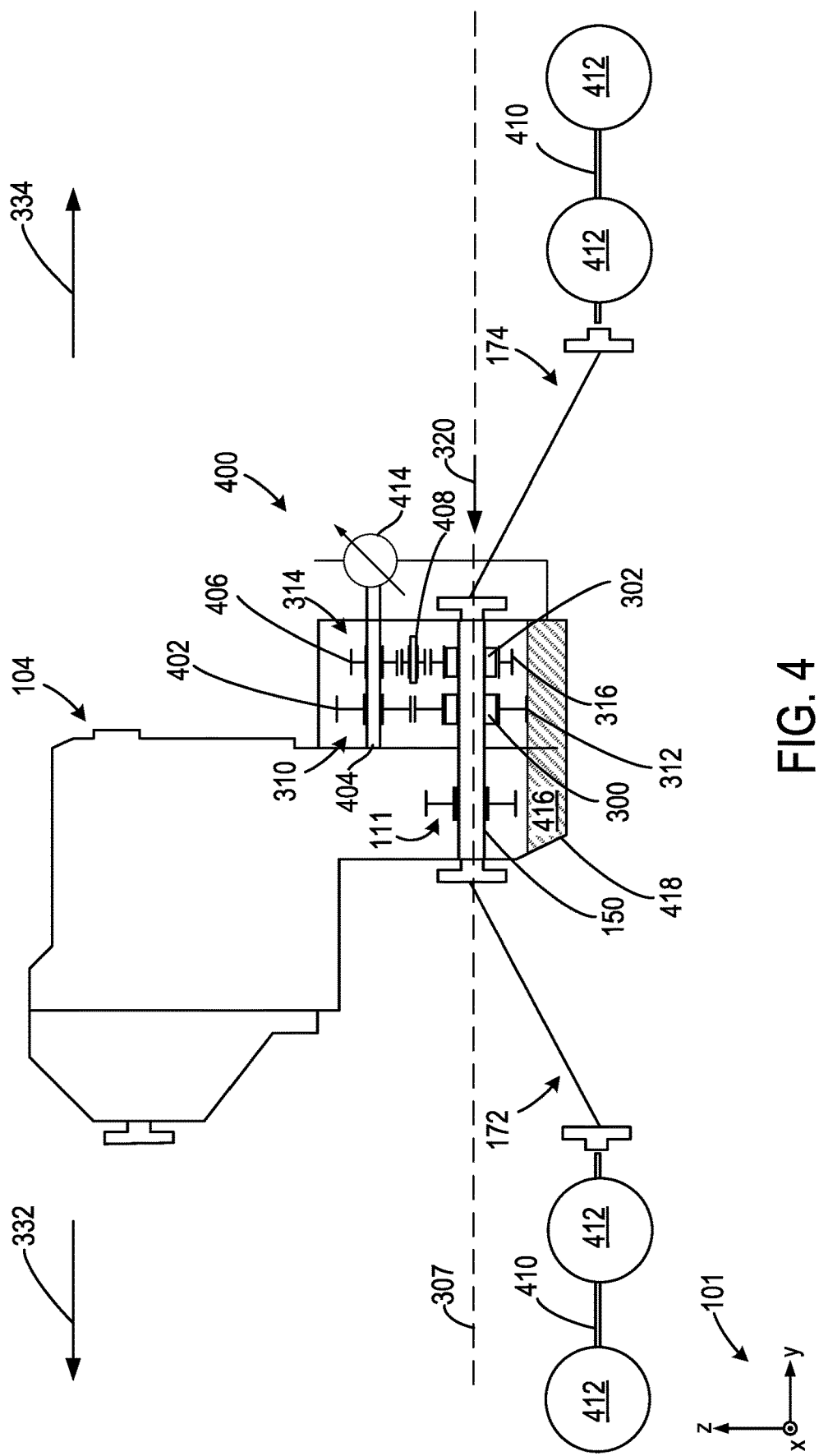
FIG. 4 shows an example of a mechanical assembly coupled to an output shaft of the transmission of FIG. 1, the mechanical assembly configured to drive operation of a pump.
Figure 5:
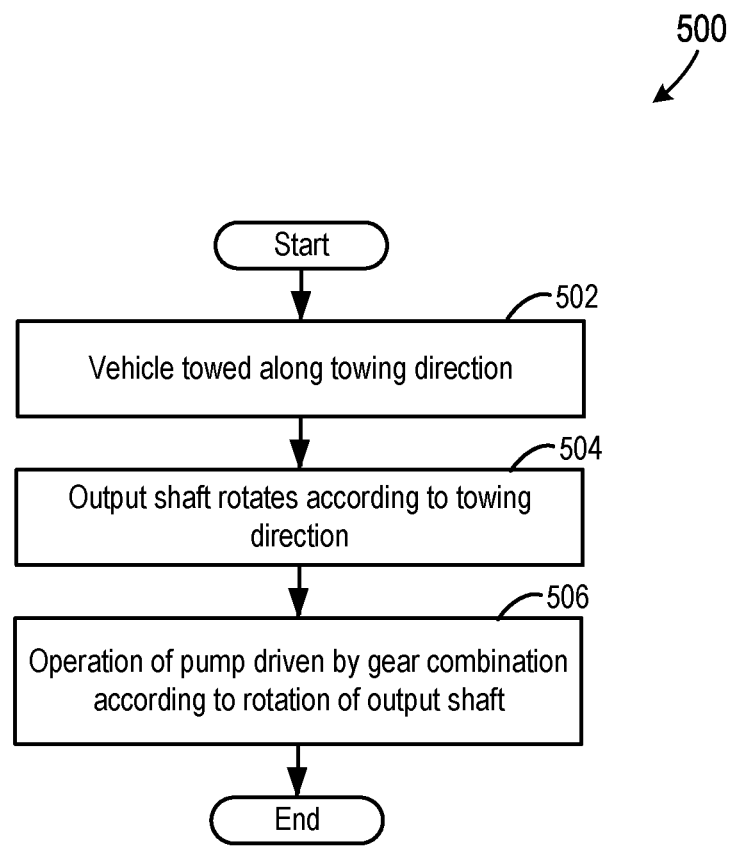
FIG. 5 shows a method for lubricating components of the transmission via the mechanical assembly of FIG. 4.

FIG. 1 shows a vehicle with a transmission that includes a PTO assembly configured to drive a PTO device in one rotational direction during both forward and reverse drive. FIGS. 2A-2B show the power paths through the PTO assembly during both forward and reverse drive operation. Additionally or alternatively, a pump assembly may be coupled to an output shaft of the transmission of FIG. 1 to deliver a lubricant to wet clutches of the transmission during certain conditions, such as when the vehicle is towed. An example of a clutch arrangement of the pump assembly relative to the output shaft is illustrated in FIG. 3 and a configuration of the pump assembly is depicted in FIG. 4. An example of a method for operating a pump via the pump assembly during towing operations is depicted in FIG. 5.

FIG. 1 depicts a vehicle 100 with a driveline system 102 (e.g., an electric driveline system or a hydraulic driveline system). In one example, the vehicle 100 may be an electric vehicle (EV), such as a battery electric vehicle (BEV). All-electric vehicles may specifically be used due to their reduced complexity and therefore reduced points of potential component degradation in comparison to hybrid electric vehicles (HEVs). However, HEV embodiments may be employed where the vehicle includes an internal combustion engine (ICE). The vehicle 100 may be a light, medium, or heavy duty vehicle. In one specific use-case example, the vehicle may be a tractor with a front end loader. However, the vehicle may take a variety of forms, in other examples.

The driveline system 102 includes a transmission 104 (e.g., gearbox). The transmission 104 may be rotationally coupled to a first prime mover 106 and a second prime mover 108. However, in other examples, the second prime mover may be omitted from the driveline system 102. The first prime mover 106 and the second prime mover 108 are configured to rotate in both clockwise and counterclockwise directions to allow the transmission to be operated in a forward drive mode and a reverse drive mode. A first prime mover shaft 109 provides rotational connection between the prime mover 106 and a PTO assembly 111 as well as the transmission 104. Further, a second prime mover shaft 113 may provide rotational connection between the second prime mover 108 and the transmission 104. The first prime mover shaft 109 and second prime mover shaft 113 may each be shafts that may rotationally couple to the first prime mover 106 and the second prime mover 108, respectively.

One or both of the prime movers 106, 108 may be electric motors, in one example. However, one or both of the prime movers may be hydraulic motors. In the electric motor example, the prime movers may include a rotor and a stator that electromagnetically interacts during operation to generate motive power. Furthermore, the prime movers may be motor-generators which also generate electrical energy during regeneration operation. Further, the prime movers may have similar designs and sizes, in one example. In this way, manufacturing efficiency of the system may be increased. However, the prime movers may have differing sizes and/or component designs, in alternate examples.

Further, when the prime movers 106, 108 are electric motors they may specifically be configured as multi-phase electric machines that are supplied with electrical energy through the use of a first inverter 110 and a second inverter 112. For example, electrical energy may be supplied to the first prime mover 106 via the first inverter 110. Likewise, electrical energy may be supplied to the second prime mover 108 via the second inverter 112. These aforementioned inverters and the other inverters described herein are configured to convert direct current (DC) to alternating current (AC) and vice versa. As such, the prime movers 106, 108 as well as the other prime movers may be AC machines. For instance, the prime movers 106, 108 and the inverters 110, 112 may be three-phase devices, in one use-case example. However, motors and inverters configured to operate using more than three phases have been envisioned. The electrical connections between the inverters 110, 112 and the prime movers 106, 108 is indicated via electrical connectors 114, 116 (e.g., multi-phase wires, bus bars, combinations thereof, and the like), respectively.

The inverters 110, 112 may receive DC power from at least one electrical energy source 118 (e.g., an energy storage device such a traction battery, a capacitor, combinations thereof, and the like, and/or an alternator). Arrows 105 indicate the flow of electrical energy from the electrical energy source 118 to the prime movers 106, 108. Alternatively, each inverter may draw power from at least one distinct energy source. When both the inverters 110, 112 are coupled to one energy source, the inverters may operate at a similar voltage. Alternatively, if both the inverters 110, 112 are coupled to distinct electrical energy sources, they may operate at different voltages, in some examples. In the hydraulic motor example, the prime movers 106, 108 may be generally configured to convert hydraulic pressure into torque.

The system 102 further includes the PTO assembly 111. The PTO assembly 111 includes a PTO device 119 that is driven by gears, shafts, clutches, and the like. These gears, shafts, and clutches are configured to provide uni-directional input to a PTO device 119 while the first prime mover 106 rotates in both a first rotational direction and a second rotational direction. These rotational directions may correspond to forward and reverse drive modes or vice versa.

The PTO device 119 may be a uni-directional pump. To elaborate, in such an example, the uni-directional pump may be a uni-directional charging pump that provides pressurized hydraulic fluid to the clutches. In other examples, the PTO device may be a uni-directional working pump that provides pressurized hydraulic fluid to the hydraulic motor (e.g., hydraulic cylinders in the motor) for motive operation or a uni-directional steering pump that provides pressurized hydraulic fluid to a steering system. The working pump may be used to power vehicle implements such as a front end loader, a hydraulically adjustable bed, a compactor, an auger, combinations thereof, and the like.

The PTO assembly 111 further includes a first one-way clutch 120 and a second one-way clutch 121. In the illustrated example, the one-way clutches 120, 121 are positioned coaxial to the first prime mover shaft 109. Alternatively, the one-way clutches 120, 121 may be positioned coaxial to an output shaft 122 in the PTO assembly 111. The first one-way clutch 120 is configured to engage and rotationally drive a gear 123 via the first prime mover shaft 109 when the prime mover 106 rotates in a first direction. In this way, the first prime mover 106 is configured to selectively engage with the first prime mover shaft 109 when the first prime mover 106 rotates in the first rotational direction. Conversely, the first one-way clutch 120 is configured to freewheel when the first prime mover 106 rotates in a second rotational direction that opposes the first rotational direction. As discussed herein, during freewheel of the clutch torque transfer between the shaft and the gear associated with the one-way clutch is inhibited. The second one-way clutch 121 is configured to engage and drive a gear 124 via the first prime mover 106 when the first prime mover 106 rotates in a second direction that is opposite the first direction. Conversely, the second one-way clutch freewheels when the first prime mover 106 rotates in the first direction.

Using two one-way clutches that are configured to freewheel in opposite rotational directions, allows the mechanical branches (expanded upon herein) to which they are attached to be conversely driven when the first prime mover 106 spins in opposite directions. In other words, one of the clutches and power paths is driven while the other remains inactive while a prime mover, such as the first prime mover 106, spins clockwise and counterclockwise. For example, a first clutch and a first power path are driven while a second clutch and a second power path remain inactive when the prime mover spins clockwise. For another example, the second clutch and the second power path are driven while the first clutch and the first power path remain inactive when the prime mover spins counterclockwise. As a result, the PTO device 119 is provided with a uni-directional input during both forward drive and reverse drive in the driveline system 102.

One or both of the one-way clutches 120, 121 may be a roller type one-way clutch. As an example, roller type one-way clutches may include spring loaded rollers and ramps on the inner race. In another example, sprag type one-way clutches may be used. The sprag type one-way clutches may include multiple asymmetric sprags with curved surfaces that enable the clutches to transfer torque between an inner and outer race of the respective clutch while rotated in one direction, and freewheel when rotated in the other direction. In other examples, one or both of the one-way clutches may be a ratcheting type one-way clutch.

There may be at least two mechanical branches that comprise a plurality of parallel set of mechanical branches. For example, system 102 shows a first mechanical branch 125 rotationally couples the first one-way clutch 120 to the output shaft 122. Conversely, a second mechanical branch 126 rotationally couples the second one-way clutch 121 to the output shaft 122. The second mechanical branch 126 reverses the rotational direction of the mechanical power flowing therethrough. In this way, the PTO device 119 is driven via a uni-directional input during clockwise and counterclockwise rotation of the first prime mover 106. A parallel set of mechanical branches comprise or include the first mechanical branch 125 and second mechanical branch 126 that may selectively and drivingly couple the first prime mover shaft 109 to the output shaft 122, via the first one-way clutch 120 and second one-way clutch 121, respectively. More generally, the first and second mechanical branches are arranged in parallel and allow power to be transferred between the first prime mover shaft 109 and the output shaft 122 through each of the paths during different rotational conditions of the first prime mover shaft 109.

The mechanical branches 125, 126 include gears in the illustrated example. However, in other examples, at least one of the mechanical branches may include chains and/or belts that enable mechanical power to be transferred between the associated clutch and the output shaft 122. The gears described herein include teeth, and mechanical attachment between the gears involves meshing of the teeth. The ratio of the gears in each of the mechanical branches 125, 126 may be selected based on PTO output speed targets, the size and speed range of the first prime mover 106, and the like.

The first mechanical branch 125 in the illustrated example includes a first set of gears 127 and the second mechanical branch 126 conversely include a second set of gears 128. A parallel set of gears sets may comprise or include the first set of gears 127 and second set of gears 128. The first mechanical branch 125 contains a different number of gears than the second mechanical branch 126, wherein the first set of gears 127 has a different number of gears from the second set of gears 128. To enable the reversal of the rotation, the second set of gears 128 includes an even number of gears and the first set of gears 127 includes an odd number of gears. Specifically, the first set of gears 127 includes three gears:

gear 123, gear 129, and gear 130, and the second set of gears 128 includes two gears: gears 124, 131. However, the first set of gears may include five or seven gears and the second set of gears may include four or six gears. The number of gears in the gearsets may be selected based on a variety of factors such as target ratios of the mechanical branches, prime mover speed range, space constraints of surrounding vehicle systems, shaft construction, and the like.

The gear 129 in the first mechanical branch 125 may be referred to as an idler gear and rotates on an idler shaft 132. Further, the gear 123 in the first mechanical branch 125 may be coupled to or incorporated into the first one-way clutch 120 (e.g., an outer race). As such, the gear 123 may radially extend from the outer race of the first one-way clutch 120. Further, the gear 130 in the first mechanical branch 125 may be fixedly coupled to or incorporated into the output shaft 122. For instance, the gear 130 may be welded, splined, press-fit, integrally formed therein, combinations thereof, and the like to the output shaft 122.

The gear 124 in the second mechanical branch 126 may be coupled to or incorporated into the second one-way clutch 121 (e.g., an outer race). Further, the gear 131 in the second mechanical branch 126 may be fixedly coupled to or incorporated into the output shaft 122. For instance, the gear 131 may be welded, splined, press-fit, integrally formed therein, combinations thereof, and the like to the output shaft 122.

Bearings 115 and 117 are coupled to the first prime mover shaft 109 and the output shaft 122, respectively. The bearings 115, 117 as well as the other bearings described herein may include inner races, outer races, and roller elements (e.g., cylindrical rollers, spherical rollers, tapered cylindrical rollers, and the like). The bearings may be rollingly coupled to and support complementary shafts, (e.g. the shafts to which the bearings are attached). When the bearings couple to and support the shafts to which they are attached, the bearings may facilitate rotation of the shaft. The bearings may be positioned within a housing of the transmission. Further, bearings may be coupled to opposing sides of the idler shaft 132.

The PTO device 119 may be coupled to (e.g., hydraulically coupled to) one or more auxiliary device(s) 133 as denoted via arrow 134. For instance, hydraulic lines, conduits, and the like may be used to establish the hydraulic connection between the PTO device 119 and the auxiliary device(s) 133.

The first and second prime mover shafts 109, 113 of the prime movers 106, 108 may have gears 135, 136 which reside thereon, respectively. In some examples, the gear 135 may be fixedly coupled to the first prime mover shaft 109 such that they co-rotate. For instance, the gear 135 may be splined, welded, press-fit, integrally formed therein, combinations thereof, and the like to the first prime mover shaft 109. In another example, a clutch (e.g., a friction clutch and/or synchronizer) may be used to attach the gear 135 to the first prime mover shaft 109 such that the shaft and gear are capable of being rotationally coupled and decoupled based on the transmission's operating conditions. For instance, the first prime mover 106 may be decoupled from the transmission when the vehicle is stationary but drive the auxiliary device(s) 133 via the PTO device 119 if desired. However, it will be appreciated that adding a disconnect clutch may increase the cost and complexity of the system. Still further in other examples, chains and/or belts, additional gears, shafts, and the like may be used to attach the first prime mover shaft 109 to the transmission 104.

The gear 136 may be fixedly coupled to the second prime mover shaft 113. For instance, the gear 136 may be splined, welded, press-fit, integrally formed therein, combinations thereof, and the like to the second prime mover shaft 113.

The gears 135, 136 are each coupled to (e.g., in meshing engagement with) a gear 141 of a planetary gearset 137 in the transmission 104. The planetary gearset 137 may include a shaft 140 which connects the gear 141 to a sun gear 142. The gears 135, 136 may specifically be positioned on different sides 144, 146 of the transmission 104 to enhance packaging and provide a more balanced weight distribution in the driveline system 102, if wanted. Side 144 is positioned opposite to side 146, wherein side 144 is one side of the planetary gearset 137 and side 146 is directly opposite to side 144 across a centerline of the planetary gearset 137. More generally, the rotational axes of the gears 135 and 136 as well as the prime movers 106 and 108 may be parallel to one another.

In the illustrated example, a friction clutch 148 is coupled to the shaft 140 and configured to selectively and rotationally couple the shaft to an output shaft 150. However, in other examples, the friction clutch 148 may be omitted from the transmission or the transmission may have a different architecture. A friction clutch, including the friction clutch 148, as described herein, may include two sets of plates configured to frictionally engage and disengage one another while the clutch is opened and closed. As such, the amount of torque transferred through the clutch may be modulated depending on the degree of friction plate engagement. Thus, the friction clutches described herein may be operated with varying amounts of engagement (e.g., continuously adjusted through the clutch's range of engagement). Further, the friction clutches described herein may be wet friction clutches through which lubricant is routed to increase clutch longevity. However, dry friction clutches may be used in alternate examples. The friction clutch 148 and the other clutches described herein may be adjusted via hydraulic, pneumatic, and/or electro-mechanical actuators. For instance, hydraulically operated pistons may be used to induce clutch engagement of the friction clutches. However, solenoids may be used for electro-mechanical clutch actuation, in other examples.

The sun gear 142 in the planetary gearset 137 may be coupled to the shaft 140. Further, planet gears 152, in the planetary gearset 137, may be coupled to the sun gear 142. Further, the planet gears 152 may be mechanically coupled to a ring gear 154 in the planetary gearset 137, such that the planet gears 152 may drive or be driven by the ring gear 154. When mechanically coupled, the teeth of the planet gears 152 may be meshed with the teeth of the ring gear 154.

A shaft 156 may extend from the ring gear 154 and have a friction clutch assembly 158 residing thereon. The friction clutch assembly 158 may include a synchronizer 160 arranged in series with a friction clutch 162. Placing the synchronizer 160 in series with the friction clutch 162 enables the transmission's efficiency to be increased when operating in the second gear. To elaborate, the synchronizer 160 permits a portion of the shaft 164 to be disconnected from the friction clutch 162 and freely rotate while the system operates in the second gear. As such, the plates in the friction clutch 162 may not rotate when the synchronizer 160 is disengaged. Conversely, when the synchronizer 160 is engaged, the shaft 164 and the shaft 156 of the ring gear 154 rotate in unison. The synchronizer 160 is configured to synchronize the speed of the shaft 156 and a shaft 164 coupled to the friction clutch 162, and mechanically lock rotation of the shafts 156, 164, when engaged. To increase system compactness, the friction clutches 148, 162 as well as the output shaft 150 may be coaxially arranged. To permit this coaxial arrangement, the sun gear 142 may include an opening 168 through which the output shaft extends. However, other clutch, shaft, and/or gear arrangements may be used in alternate examples.

The friction clutch 162 is configured to ground the ring gear 154, in the illustrated example. However, other clutch configurations have been contemplated. For instance, the friction clutch may ground a carrier 179, in another embodiment. To accomplish the ring gear grounding, the friction clutch 162 may include a housing with a portion of the friction plates coupled thereto and fixedly attached to a stationary component, such as the transmission's housing, e.g., the housing of transmission 104. A bearing 170 may be positioned between the shaft 156 and the output shaft 150 to enable these shafts to independently rotate, during certain conditions.

In the illustrated example, the output shaft 150 includes output interfaces 172, 174 (e.g., yokes, splines, combinations thereof, or other suitable mechanical interfaces) configured to attach to axles (e.g., front or rear axles) via shafts, joints (e.g., U-joints), chains, belts, combinations thereof, and the like. For example, the output shaft 150 is illustrated interfacing with axles via the output interface 172, 174 in FIG. 4, as described further below. The axles may include differentials that are rotationally coupled to axle shafts which are in turn rotationally coupled to drive wheels. In other examples, the output shaft may include a single output interface that is connected to an axle (e.g., a front axle or a rear axle).

Disconnect clutches 176, 178 may be provided for each of the output interfaces 172, 174. As such, the disconnect clutches 176, 178 may be configured to mechanically couple and decouple the output shaft 150 from the output interfaces 172, 174. In this way, the transmission's capabilities may be further expanded to enable single and multi-axle operation. For instance, four-wheel drive may be engaged when additional traction is desired and two-wheel drive may be engaged when the additional traction is not desired to reduce driveline losses and tire wear. In this way, the handling performance of the vehicle is enhanced. The disconnect clutches 176, 178 may be dog clutches, synchronizers, friction clutches, combinations thereof, or other suitable clutches. Dog clutches and/or synchronizers may be specifically used as axle disconnect devices, in some examples, to reduce losses when the clutches are disengaged, when compared to friction clutches.

The planet gears 152 rotate on the carrier 179 of the planetary gearset 137. The carrier 179 is rotationally coupled to the output shaft 150. The planetary gearset 137 may be a simple planetary gearset that solely includes the sun gear 142, ring gear 154, planet gears 152, and carrier 179. By using a simple planetary assembly, transmission compactness may be increased when compared to more complex planetary assemblies such as multi-stage planetary assemblies, Ravigneaux planetary assemblies, and the like. Consequently, the driveline system may pose less space constraints on other vehicle components, thereby permitting the system's applicability to be expanded. Further, losses in the transmission may be decreased when a simple planetary gearset is used as opposed to more complex gear arrangements. However, transmissions with other gearing arrangements have been contemplated, including transmissions that do not employ planetary gearing.

Depending on the gear ratio of the transmission, mechanical power may travel through the carrier 179 to the output shaft 150 or from the sun gear 142 to the output shaft. The transmission 104 is configured to shift (e.g., powershift) between different operating gears. The shifting operation may involve engaging the friction clutch 148 and disengaging the friction clutch 162 or vice versa.

The vehicle 100 further includes a control system 192 with a controller 193 as shown in FIG. 1. The controller 193 may include a microcomputer with components such as a processor 194 (e.g., a microprocessor unit), input/output ports, an electronic storage medium 195 for executable programs and calibration values (e.g., a read-only memory chip, random access memory, keep alive memory, a data bus, and the like). The storage medium may be programmed with computer readable data representing instructions executable by the processor for performing the methods and control techniques described herein as well as other variants that are anticipated but not specifically listed.

The controller 193 may receive various signals from sensors 196 coupled to various regions of the vehicle 100 and specifically the transmission 104. For example, the sensors 196 may include a pedal position sensor that is configured to detect a depression of an operator-actuated pedal such as an accelerator pedal and/or a brake pedal, a speed sensor at the transmission output shaft, energy storage device state of charge (SOC) sensor, clutch position sensors, and the like. Motor speed may be ascertained from the amount of power sent from the inverter to the electric machine. An input device 197 (e.g., accelerator pedal, brake pedal, drive mode selector, PTO mode selector, two wheel and four-wheel drive selector, combinations thereof, and the like) may further provide input signals indicative of an operator's intent for vehicle control. For instance, buttons, switches, and/or a touch interface may be included in the vehicle to enable the operator to toggle between a two-wheel drive mode and a four-wheel drive mode.

Upon receiving the signals from the various sensors 196 of FIG. 1, the controller 193 processes the received signals, and employs various actuators 198 of vehicle components to adjust the components based on the received signals and instructions stored on the memory of controller 193. For example, the controller 193 may receive an accelerator pedal signal indicative of an operator's request for increased vehicle acceleration. In response, the controller 193 may command operation of the prime movers and increase the mechanical power delivered from the first and second prime movers 106,108 to the transmission 104. When the prime movers are multiphase electric motors, the control commands may be sent to the inverters, such as the inverters 110, 112. The controller 193 may during certain operating conditions, be configured to send commands to the clutches 148, 160, 162, 176, and/or 178 to engage and disengage the clutches. For instance, a control command from the controller 193 may be sent to a clutch assembly, such as the friction clutch assembly 158, and in response to receiving the command, an actuator of actuators 198 in the clutch assembly may adjust the clutch based on the command for clutch engagement or disengagement. The other controllable components in the vehicle may function in a similar manner with regard to sensor signals, control commands, and actuator adjustment, for example. The controller 193 may be configured to control the friction clutches 148, 162 to synchronously shift between two of the transmission's operating gears.

An axis system 101 is provided in FIG. 1, as well as FIGS. 2A-2B, and FIGS. 4-5 for reference. The z-axis may be a vertical axis (e.g., parallel to a gravitational axis), the x-axis may be a lateral axis (e.g., horizontal axis), and/or the y-axis may be a longitudinal axis. The y-axis of the axis system 101 may be parallel with the tow directions for the vehicle 100. However, alternate orientations of the axes may be used, in other examples.

The transmission 104 has two clutches that enable it to function as a two-speed transmission. However, in other embodiments, additional clutches may be added to or omitted from the transmission to enable it to be operated in a greater or fewer number of gears. As such, the transmission may have three or more speeds, in other embodiments.

FIGS. 2A-2B depict mechanical power paths 250 and 252, respectively, through the PTO assembly 111 while the driveline system 102 is operated in both a forward drive mode and a reverse drive mode, respectively. The first prime mover 106 is shown along with the PTO assembly 111. The first one-way clutch 120 and the second one-way clutch 121 are shown including inner races 200 and outer races 202 and internal componentry 204 that facilitates one-way clutch functionality. The internal componentry 204 may include rollers, sprags, ratcheting devices, and the like as previously discussed.

Turning specifically to FIG. 2A, the forward drive mode may be associated with rotating the first prime mover 106 in a clockwise direction, in one example. However, the forward drive mode may be associated with rotating the prime mover in a counterclockwise direction, in other examples.

When the first prime mover 106 rotates in the clockwise direction, the first one-way clutch 120 engages such that mechanical power is transferred from the first prime mover shaft 109 to the gear 123 by way of the first one-way clutch 120. Conversely, when the first prime mover 106 rotates in the clockwise direction, the second one-way clutch 121 freewheels such that mechanical power is not transferred from the first prime mover shaft 109 to the gear 124. In this way, the PTO assembly 111 may transfer mechanical power through one of the parallel mechanical branches while forgoing mechanical power transfer through the other mechanical branch.

The power path 250 unfolds as follows, mechanical power is transferred from the first prime mover 106 to the first prime mover shaft 109. The power path then branches into a first branch 254 and a second branch 256. The first branch 254 provides mechanical power to the PTO assembly 111 and the second branch 256 provides mechanical power to downstream transmission components (e.g., the gear 135 depicted in FIG. 1) via the first prime mover shaft 109. In the first branch 254, mechanical power is transferred from the first prime mover shaft 109 to the gear 123 by way of the first one-way clutch 120. Next, power is transferred to the idler gear 129 from the gear 123. Next, power is transferred from the idler gear 129 to the gear 130 and from the gear 130 to the output shaft 122. Power is then transferred to the PTO device 119 from the shaft. In this way, power is transferred through the first mechanical branch 125 while power is not transferred through the second mechanical branch 126. Thus, power only flows through one of the parallel mechanical branches to allow the PTO device 119 to be uni-directionally driven.

Turning specifically to FIG. 2B, the reverse drive mode may be associated with rotating the first prime mover 106 in a counterclockwise direction, in one example. However, the reverse drive mode may be associated with rotating the prime mover in a clockwise direction, in other examples.

When the first prime mover 106 rotates in the counter-clockwise direction, the second one-way clutch 121 engages such that mechanical power is transferred from the first prime mover shaft 109 to the gear 124 by way of the second one-way clutch 121. Conversely, when the first prime mover 106 rotates in the counterclockwise direction, the first one-way clutch 120 freewheels such that mechanical power is not transferred from the first prime mover shaft 109 to the gear 123. In this way, the PTO assembly 111 may transfer mechanical power through one of the parallel mechanical branches while forgoing mechanical power transfer through the other mechanical branch.

The power path 252 again includes a first branch 258 that directs power to the PTO assembly 111 and a second branch 260 that directs power to downstream transmission components. However, in the first branch 258, mechanical power is transferred from the first prime mover shaft 109 to the gear 124 by way of the second one-way clutch 121. Next, power is transferred between the gear 123 and the gear 131. Next, power is transferred to the output shaft 122 from the gear 131 and from the output shaft 122 to the PTO device 119. In this way, power is transferred through the second mechanical branch 126 while power is not transferred through the first mechanical branch 125. Thus, power only flows through one of the parallel mechanical branches to allow the PTO device 119 to be uni-directionally driven. In this way, the PTO device 119 receives mechanical power during both forward and reverse drive, thereby expanding the PTO assembly's window of operation for PTO assembly 111. Customer appeal may be increased as a result. Driving the PTO in both forward and reverse may be particularly desirable in vehicles such as front end loaders. However, the driveline system described herein may be used in a wide variety of vehicles.

The mechanical power of power path 250 and power path 252 may be rotational power. The rotational energy of the rotational power may be transferred between components via torque.

A transmission of a vehicle, may additionally or alternatively include a pump assembly with a configuration that is analogous to the PTO assembly of FIGS. 1-2B. The pump assembly may be used to operate a pump when a vehicle is in a mode where the vehicle's prime mover is not actively providing power to rotate a transmission of the vehicle. Instead, rotation of the transmission may be compelled by spinning of the vehicle wheels and associated axles, which may be rotationally coupled to components of the transmission. For example, during towing of the vehicle, the vehicle may be towed in a forward direction, e.g., in a direction associated with operation in a forward drive, or in a reverse direction, e.g., in a direction associate operation in a reverse drive.

During such compelled motion of the transmission, wet clutches of the transmission, such as any of the clutches 148, 160, 162, 176, and/or 178 of FIG. 1, may experience undesirable contact and friction which, without lubrication, may lead to degradation of the clutches. In some examples, mechanical disconnect devices may be used to disconnect the transmission from the axles in order to maintain the transmission stationary. However, in some instances, installation of such devices may not be possible. In order to mitigate clutch degradation without relying on costly and complex lubricant circuits in such examples, while enabling the pump to operate regardless of towing direction, a pump assembly may include a set of one-way clutches arranged in a similar manner as described above, to allow a uni-directional pump to be used in the pump assembly. The pump assembly may be coupled to an output shaft of the transmission. In one example, the output shaft may be extended, e.g., have a length that is greater compared to an output shaft used in a conventional transmission without the pump assembly, to enable coupling of the pump assembly thereto. The extended length of the output shaft may provide packaging space along the output shaft for positioning one-way clutches of the pump assembly along the output shaft. For example, the pump assembly may be coupled to the output shaft 150 of the transmission 104 of FIG. 1 at either of a first region 301 or a second region 303 indicted in FIG. 1 by dashed rectangles.

An example of a coupling of a first one-way clutch 300 and a second one-way clutch 302 to the output shaft 150 of the vehicle 100 of FIG. 1 is illustrated in FIG. 3. The first one-way clutch 300 and second one-way clutch 302 may collectively be a multi-clutch. The first one-way clutch 300, the second one-way clutch 302, and the output shaft 150 may be centered about an axis 307. When centered about axis 307, the first one-way clutch 300, the second one-way clutch 302, and the output shaft 150 may be positioned radially about (e.g., radially around) the axis 307. The axis 307 may be parallel with the y-axis of the axis system 101. The axis 307 may be a rotational axis for the first one-way clutch 300, the second one-way clutch 302, and the output shaft 150. The first one-way clutch 300, the second one-way clutch 302, and the output shaft 150 may rotate about the axis 307, such as via spinning around the axis 307. The shaft 150 may drivingly couple to and receive rotational energy via torque from a prime mover, such as the prime mover 106 of FIG. 1. The shaft 150 may be an input, and may deliver rotational energy via torque to the first one-way clutch 300 and second one-way clutch 302. The first one-way clutch 300 and second one-way clutch 302 may also freewheel around the shaft 150.

Each of the one-way clutches 300, 302 includes an inner race 304 and an outer race 306 spaced apart by internal componentry 308, such as rollers, sprags, ratcheting devices, etc. Each outer race 306 may be positioned about the internal componentry 308, such as to encircle or be radially about the internal componentry 308. Likewise, the internal componentry 308 may be about each inner race 304, such as to encircle or be radially about the inner race 304. Each inner race 304 may rigidly couple to the output shaft 150, where each inner race 304 may rotate in the same direction as the output shaft 150. Each outer race 306 may freewheel around the inner race 304 the outer race 306 is complementary to and the output shaft 150. When freewheeling, the outer race 306 may not receive torque from the output shaft 150. Likewise, each outer race 306 may selectively couple to the inner race 304 complementary to the outer race 306. When selectively coupled to the inner race 304 that is complementary, the outer race 306 may rotate in the same direction as and be driven by the inner race 304. For example, the outer race 306 of the first clutch 300 may selectively couple to the inner race 304 of the first clutch 300. The outer race 306 of the first clutch 300 may freewheel about the inner race 304 of the first clutch 300 and the output shaft 150. Likewise, the outer race 306 of the second clutch 302 may selectively couple to the inner race 304 of the second clutch 302. The outer race 306 of the second clutch 302 may freewheel about the inner race 304 of the second clutch 302 and the output shaft 150.

The one-way clutches 300, 302 may be configured as described above, with reference to the one-way clutches of the PTO assembly of FIGS. 1-2B. The first one-way clutch 300 may be referred to alternatively herein as the first clutch 300. Likewise, the second one-way clutch 302 may be referred to alternatively herein as the second clutch 302. The first clutch 300 is included in a first gear combination 310, of which only a first clutch gear 312 that circumferentially surrounds the first clutch 300 is shown in FIG. 3. A mechanical system may comprise the first gear combination 310 and the second gear combination 314, including the first clutch 300 and second clutch 302. For an example of an embodiment, the first gear combination 310 and the second gear combination 314, including the first clutch 300 and the second clutch 302, may couple to and be about the output shaft 150 at the first region 301 of FIG. 1. The first clutch 300 and the second clutch 302 may encircle the output shaft 150. For an example of an embodiment, the first gear combination 310 and the second gear combination 314, including the first clutch 300 and the second clutch 302, may couple to and be about the output shaft 150 at the second region 303 of FIG. 1. The second clutch 302 is included in a second gear combination 314, of which only a second clutch gear 316 that circumferentially surrounds the second clutch 302 is shown in FIG. 3. Each of the first clutch 300 and the second clutch 302 may be self-locking clutches that lock to or engage with the output shaft 150 in opposite rotational directions relative to one another. Accordingly, the clutches also freewheel in opposite rotational directions relative to one another.

For example, the first clutch 300 may be fixedly coupled to the first clutch gear 312, such that rotation of the outer race 306 of the first clutch 300 compels rotation of the first clutch gear 312 in a common direction. In other words, the first clutch gear 312 rotates in unison with the outer race 306 of the first clutch 300. Arrows 318 indicate directions the output shaft 150 may rotate, and are locking and unlocking directions of the inner and outer races 304, 306 of the first clutch 300. The unlocking direction of the inner race 304 of the first clutch 300 may be represented by a first arrow 318a, and the locking direction of the inner race 304 of the first clutch 300 may be represented by a second arrow 318b. The first arrow 318a and second arrow 318b curve in opposite directions to one another. When locked, the inner race 304 of the first clutch 300 may selectively couple and rigidly connect with the outer race 306 of the first clutch 300. When locked, the outer race 306 of the first clutch 300 may rotate with and be driven by the inner race 304 of the first clutch 300. When the shaft 150 rotates in the direction of the first arrow 318a, the inner race 304 of the first clutch 300 may un-lock with the outer race 306 of the first clutch 300, and the outer race 306 of first clutch 300 may freewheel and not receive rotational energy from the shaft 150. When the shaft 150 rotates in the direction of the second arrow 318b, the inner race 304 of the first clutch 300 may lock with the outer race 306 of the first clutch 300, and rotational energy may transfer from the shaft 150 to the outer race 306 and first clutch gear 312. When the first clutch 300 is locked to the output shaft 150, the first clutch gear 312 may rotate in a counterclockwise direction relative to a perspective along the y-axis indicated by arrow 320. When the first clutch 300 is locked to the output shaft 150, the output shaft 150 and the first clutch gear 312 may rotate in a counterclockwise direction relative to a perspective along the y-axis of the axis system 101.

Similarly, the second clutch 302 may be fixedly coupled to the second clutch gear 316 such that rotation of the outer race 306 of the second clutch 302 compels rotation of the second clutch gear 316 in a common direction. The second clutch gear 316 may thereby rotate in unison with the outer race 306 of the second clutch 302. Arrows 322 indicate locking and unlocking directions of the inner and outer races 304, 306 of the second clutch 302. The unlocking direction of the inner race 304 of the second clutch 302 may be represented by a first arrow 322a, and the locking direction of the inner race 304 of the second clutch 302 may be represented by a second arrow 322b. The first arrow 322a and second arrow 322b curve in opposite directions to one another. When locked, the inner race 304 of the second clutch 302 may selectively couple and rigidly connect with the outer race 306 of the second clutch 302. When locked, the outer race 306 of the second clutch 302 may rotate with and be driven by the inner race 304 of the second clutch 302.

When the shaft 150 rotates in the direction of the first arrow 322a, the inner race 304 of the first clutch 300 may un-lock with the outer race 306 of the second clutch 302, and the outer race 306 of second clutch 302 may freewheel and not receive rotational energy from the shaft 150. When the shaft 150 rotates in the direction of the second arrow 322b, the inner race 304 of the second clutch 302 may lock with the outer race 306 of the second clutch 302, and rotational energy may transfer from the shaft 150 to the outer race 306 of the second clutch 302 and the second clutch gear 316. When the second clutch 302 is locked to the output shaft 150, the second clutch gear 316 may rotate in a clockwise direction relative to the perspective indicated by arrow 320. When the second clutch 302 is locked to the output shaft 150, the output shaft 150 and second clutch gear 316 may rotate in a clockwise direction relative to the y-axis of the axis system 101.

The first arrow 318a curves in the same direction as the second arrow 322b and opposite direction of the first arrow 322a. The second arrow 318b curves in the same direction as first arrow 322a and opposite direction of the second arrow 322b. The first arrow 322a curves in an opposite direction the first arrow 318a, and the second arrow 322b curves in an opposite direction to second arrow 318b. When the output shaft 150 rotates in the direction of the first arrow 318a and the second arrow 322b, the first clutch 300 unlocks from the output shaft 150 and the second clutch 302 locks to the output shaft 150. When the output shaft 150 rotates in the direction of the second arrow 318b and the first arrow 322a, the first clutch 300 locks to the output shaft 150 and the second clutch 302 unlocks from the output shaft 150. The outer race 306 of the first clutch 300 and the first clutch gear 312 may freewheel while the outer race 306 of the second clutch 302 and the second clutch gear 316 are driven by the output shaft 150. When driven by the output shaft 150, the second clutch gear 316 may rotate, such as spin, around axis 307 in the direction of the second arrow 322b. The outer race 306 of the second clutch 302 and the second clutch gear 316 may freewheel while the outer race 306 of the first clutch 300 and the first clutch gear 312 are driven by the output shaft 150. When driven by the output shaft 150, the first clutch gear 312 may rotate, such as spin, around axis 307 in the direction of the second arrow 318b.

It is to be appreciated that the locking direction and unlocking direction for the first clutch 300 and second clutch 302 may be reversed. For example, in another configuration of the mechanical system 305, the rotation of the shaft 150 in a clockwise direction with respect to a perspective along the axis 307 may lock the first clutch 300 and unlock the second clutch 302, and the rotation of the shaft 150 in a counterclockwise direction with respect to a perspective along the axis 307 may unlock the first clutch 300 and lock the second clutch 302.

A first tow direction 332 and a second tow direction 334 are shown relative to the mechanical system 305. The first tow direction 332 and the second tow direction 334 may be parallel and opposite to each other. The first tow direction 332 and the second tow direction 334 may be parallel to the axis 307. The first and second tow directions 332, 334 may be tow directions, that a vehicle housing the mechanical system 305 may be towed. For an example, the first tow direction 332 may be forward tow direction, and the second tow direction 334 may be a reverse tow direction.

The gear 123 and first one-way clutch 120 may be coupled to and positioned about the first prime mover shaft 109 as the first clutch gear 312 and first clutch 300 are coupled to and positioned about the output shaft 150, with reference to FIG. 1. Likewise, the gear 124 and second one-way clutch 121 may be coupled to and positioned about the first prime mover shaft 109 as the second clutch gear 316 and the second clutch 302 are coupled to and positioned about the output shaft 150, with reference to FIG. 1.

The first and second gear combinations 310, 314 may be included in a pump assembly 400 depicted in FIG. 4. The pump assembly 400 may be coupled to the output shaft 150 by the first clutch 300 and the second clutch 302, as described above. When coupled to the pump assembly 400, the rotational energy of the output shaft 150 transfers to the pump assembly 400. The transmission 104 of FIG. 1 may be coupled to the output shaft 150 by the PTO assembly 111 of FIG. 1, with the PTO assembly 111 shown as an abbreviated representation in FIG. 4. The transmission 104 may be coupled to the prime mover of the vehicle (e.g., the prime mover 106 of FIG. 1) by the PTO assembly 111. The first clutch gear 312 of the first gear combination 310 and the second clutch gear 316 of the second gear combination 314 may be positioned adjacently along the output shaft 150, between the output interfaces of 172, 174 of the output shaft 150, and between the PTO assembly 111 and the output interface 174. It will be appreciated that a relative positioning and orientation of the pump assembly 400 along the output shaft 150 and with respect to the PTO assembly 111 and output interfaces 172, 174 are non-limiting and variations in the position and orientation are possible, in other examples.

The first clutch gear 312 of the first gear combination 310 may be rotationally coupled to a first pump shaft gear 402. The first pump shaft gear 402 may be fixedly coupled to a pump shaft 404 that rotates in unison with the first pump shaft gear 402. The pump assembly 400 comprises a mechanical system for transferring rotation from the output shaft 150 to the pump shaft 404, wherein the mechanical system comprises the first gear combination 310, the first clutch 300, the second gear combination 314, and the second clutch 302. The first and second gear combinations 310, 314 may be a first mechanical branch and a second mechanical branch, respectively, of the pump assembly 400. Each of the first and second gear combinations 310, 314 may have at least a one-way clutch, such as the first clutch 300 for the first gear combination 310 and the second clutch 302 for the second gear combination 314. The first gear combination 310 may selectively couple the output shaft 150 to the pump shaft 404 via the first clutch 300, such that rotational energy may be transferred from the output shaft 150 to the pump shaft 404. The second gear combination 314 may selectively couple the output shaft 150 to the pump shaft 404 via the second clutch 302, such that rotational energy may be transferred from the output shaft 150 to the pump shaft 404.

The second clutch gear 316 of the second gear combination 314 may be rotationally coupled to a second pump shaft gear 406 that is also fixedly coupled to the pump shaft 404 via an intermediate gear 408 of the second gear combination 314. The intermediate gear 408 may as an example, operate as an idler gear. Transferring rotational energy from the output shaft 150 to the pump assembly 400 may be accomplished via the first gear combination 310 when the first clutch gear 312 is engaged. Likewise, transferring rotational energy from the output shaft 150 to the pump assembly 400 may be accomplished via the second gear combination 314 when the second clutch gear 316 is engaged. As described above with reference to the mechanical branches of the PTO assembly 111 of FIGS. 1-2B, the first gear combination 310 and the second gear combination 314 have different quantities of gears included therein, respectively. Although the first gear combination 310 is depicted having two gears and the second gear combination 314 having three gears in FIG. 4, other quantities are possible without departing from the scope of the present disclosure. For example, the first gear combination 310 may have four gears or six gears and the second gear combinations may include five gears or seven gears, in other examples. By incorporating gear combinations with different numbers of gears, bi-directional rotational input from the output shaft 150 may effect unidirectional rotation of the pump shaft 404. The pump shaft 404 may therein rotate in a fixed direction (e.g., a fixed rotational direction) whether the output shaft 150 rotates in a first direction complementary to the fixed direction or a second direction opposite the first direction and the fixed direction.

For example, during towing of the vehicle in the forward direction, one or more axles 410 of the vehicle may spin due to rotation of the vehicle's wheels 412. Towing in a forward direction may alternatively be referred to herein as forward towing. The forward direction may be the first tow direction 332. A spinning of the one or more axles 410 of the vehicle may be communicated to the output shaft 150 via the output interfaces 172, 174. The output shaft 150 may rotate in the first direction (e.g., a forward drive direction) corresponding to forward towing. During towing in the forward direction, the output shaft 150 may rotate, in one example, in the counterclockwise direction, from the perspective indicated by arrow 320. In other examples, however, towing in the forward direction may drive rotation of the output shaft 150 in the clockwise direction and rotation directions described below may be reversed accordingly.

When the output shaft 150 spins in the counterclockwise direction during towing in the forward direction, the first clutch 300 may lock and drive rotation of the first gear combination 310 while the second gear combination 314 may rotate freely of pump shaft 404 with the second clutch 302 disengaged from the output shaft 150. For example, the locking of the first clutch 300 may drive rotation of the first clutch gear 312 of the first gear combination 310 in the counterclockwise direction. Engagement of the first clutch gear 312 with the first pump shaft gear 402 causes the first pump shaft gear 402 to rotate in clockwise direction, which compels clockwise rotation of the pump shaft 404. The pump shaft 404 may drive operation of a pump 414 when rotating, where the pump 414 may be configured to operate only when rotating in the clockwise direction.

During towing operations in the reverse direction, the output shaft 150 may rotate in the clockwise direction, causing the second clutch 302 to lock and the first clutch 300 to disengage from the output shaft 150 and freewheel. Towing of the vehicle in the reverse may be referred to herein as reverse towing. The reverse direction may be the second tow direction 334. The second gear combination 314 may drive rotation of the pump shaft 404 (and the pump 414) and the rotation of the pump shaft 404, in turn, causes the first gear combination 310 to spin correspondingly.

The output shaft 150 may rotate in the second direction (e.g., a reverse drive direction) corresponding to reverse towing. For example, when the second clutch 302 is locked and engaged with output shaft 150, the second clutch gear 316 may rotate in the clockwise direction. Engagement of the second clutch gear 316 with the intermediate gear 408 causes the intermediate gear 408 to rotate in the counterclockwise direction. Engagement of the intermediate gear 408 with the second pump shaft gear 406, in turn, drives rotation of the second pump shaft gear 406 in the clockwise direction. The pump shaft 404 and the pump 414 may therefore also rotate in the clockwise direction, allowing the pump 414 to operate.

As a result of the different numbers of gears in the first gear combination 310 versus the second gear combination 314, e.g., an even number in the first gear combination 310 and an odd number in the second gear combination 314, the rotation of the pump shaft 404 may be constrained to a single direction, regardless of the direction of towing. The unidirectional rotation of the pump 414 is compelled whether the output shaft 150 is rotating in the clockwise or counterclockwise direction. A direction of suction and orientation of the pump relative to pressure generated at the pump 414 may be maintained constant, regardless of rotational movement of the vehicle's wheels 412 and axles 410.

It is to be appreciated the forward direction of rotation and reverse direction of rotation for output shaft 150 may be reversed from the aforementioned description above. For example, the pump 414 may be configured to operate only when rotating in the counterclockwise direction. For this example, when towed in a forward direction, such as the first tow direction 332, the shaft 150 may rotate in a clockwise direction. Likewise, when towed in the second tow direction 334, the shaft 150 may rotate in a counterclockwise direction. For this example, the first clutch 300 may be configured to lock when the shaft 150 rotates in the clockwise direction, and the second clutch 302 may be configured to lock when the shaft 150 rotates in the counterclockwise direction. The first gear combination 310 and second gear combination 314 may drive the pump shaft 404 may rotate in a counter clockwise direction. The pump shaft 404 may drive the pump 414 in a counterclockwise direction.

As described above, the pump 414 may draw a lubricant 416, such as oil, from a transmission sump, such as a sump 418, and deliver the lubricant 416 to lubricant channels of the transmission 104. The sump 418 may be housed by the transmission 104. Sump 418 may be formed from or included by features of transmission 104, such as the housing of the transmission 104. The sump 418 may store the lubricant 416. Lubricant 416 may be dripped or returned via other means to the sump 418 after lubricating components of the transmission 104, such as gearsets and shafts. Degradation resulting from friction generated during rotation of the clutches may thereby be mitigated by continuously lubricating the transmission clutches during motion that is not powered by the vehicle's prime mover (e.g., towing operations). The pump assembly 400 shown in FIG. 4 may enable use of a variety of pump types, including low cost, unidirectional pumps which may be fixed or variable. In instances where the pump 414 is a fixed pump, an additional disconnect system may be included between the first and second pump shaft gears 402, 406, and the pump shaft 404. The additional disconnect system may reduce losses when, for example, the vehicle is operating in a powered mode, e.g., when rotation of the axles 410 and wheels 412 are powered by the prime mover.

Additionally, in one example, the pump 414 may be a PTO device operated by the PTO assembly 111, as described above. As such, the pump 414 may be operated based on power transferred from the prime mover to the pump 414 via the PTO assembly 111 when the vehicle is operating in a mode where the output shaft 150 is rotated by the prime mover. The pump assembly 400 may be disconnected from the pump shaft 404 during such operation. When the prime mover is deactivated or otherwise not engaging the output shaft 150, the pump assembly 400 may be connected to the pump shaft to lubricate the transmission components when the transmission components are in motion.

As an example, the gear 123 and first one-way clutch 120 may be coupled to and positioned about the first prime mover shaft 109 as part of a first mechanical branch of the transmission 104, with reference to FIG. 1. Likewise, the gear 124 and second one-way clutch 121 may be coupled to and positioned about the first prime mover shaft 109 as a part of second mechanical branch of the transmission 104, with reference to FIG. 1. The mechanical system 305 of FIG. 3 comprising the first clutch 300 and the second clutch 302 may be drivingly coupled the output shaft 150. The first gear combination 310, comprising first clutch gear 312 and first clutch 300 may be a third mechanical branch of the transmission 104. The second gear combination 314, comprising the second clutch gear 316 and the second clutch 302, may be a fourth mechanical branch of the transmission 104. For this example, the first clutch 300 may be a third one-way clutch for the transmission 104 with reference to the first one-way clutch 120 and second one-way clutch 121. Likewise, the second clutch 302 may be a fourth one-way clutch for the transmission 104 with reference to the first one-way clutch 120 and second one-way clutch 121.

As another example, the mechanical system 305 comprising the first clutch 300 and the second clutch 302 may be coupled to the first region 301 of the output shaft 150 of FIG. 1. Additionally or alternatively, a second mechanical system that is a mechanical branch comprising a third-one way clutch and a fourth one-way clutch may be coupled to the second region 303 of the output shaft 150 of FIG. 1. The third-one-way clutch and fourth one-way clutch may be mechanically and functionally the same as the first one-way clutch and second one-way clutch, respectively.

As another example, the mechanical system 305 comprising the first clutch 300 and the second clutch 302 may be coupled to the second region 303 of the output shaft 150. Additionally or alternatively, a second mechanical system that is a mechanical branch comprising a third-one way clutch and a fourth one-way clutch may be coupled to the first region 301 of the output shaft 150. The third-one-way clutch and fourth one-way clutch may be mechanically and functionally the same as the first one-way clutch and second one-way clutch, respectively.

The mechanical system 305 comprising the first clutch 300 and the second clutch 302 may mechanically couple the respective shaft, such as the output shaft 150, the first prime mover shaft 109, or second prime mover shaft 113, to a pump assembly, such as pump assembly 400. Likewise, the second mechanical system comprising the third one-way clutch and the fourth one-way clutch may mechanically couple the respective shaft, such as the output shaft 150, the first prime mover shaft 109, or second prime mover shaft 113, to a pump assembly. The mechanical system 305 and/or the second mechanical system may be used interchangeably in any combination on the first region 301 or the second region 303.

A method 500 is shown in FIG. 5 for providing lubricant, such as lubricant 416, to a transmission of a vehicle during vehicle modes where the transmission output shaft is not rotated by power transfer from a prime mover of the vehicle. In one example, the vehicle may be the vehicle 100 of FIG. 1, configured with the PTO assembly 111 of FIGS. 1-2B and the pump assembly 400 of FIG. 4. During lubrication, a forward or reverse towing may be responsible for transferring rotational energy from the output shaft to a pump shaft of the pump assembly.

At 502 of the method, tows the vehicle along a towing direction. For example, the vehicle may be towed in a forward or a reverse direction, relative to forward drive and reverse drive directions of the vehicle. The output shaft rotates at 504, where a direction of rotation of the output shaft is dependent on the towing direction. As an example, if the vehicle is towed in the forward direction, the output shaft may rotate in a first direction and if the vehicle is towed in the reverse direction, the output shaft may rotate in a second, opposite direction.

At 506, as the output shaft rotates, a pump shaft is rotated. The pump shaft may be drive rotation and, therefore, operation of a pump. The pump shaft is linked to the output shaft by a first gear combination and a second gear combination, the gear combinations arranged in parallel with one another and having different, e.g., unequal, numbers of gears. For example, the first gear combination may have an even number of gears and the second gear combination may have an odd number of gears, or vice versa. Rotation of the output shaft may be communicated to the pump shaft by one of the gear combinations, depending on the direction of rotation of the output shaft.

For example, when the output shaft rotates in the first direction, a first clutch of the first gear combination that is coupled to the output shaft may be locked and may compel rotation of gears of the first gear combination. The second gear combination may freewheel. The rotation of the gears of the first gear combination causes the pump shaft to rotate in a given direction that operates the pump. When the output shaft rotates in the second direction, a second clutch of the second gear combination that is coupled to the output shaft may be locked and drive rotation of gears of the second gear combination. The first gear combination may freewheel. The rotation of the gears of the second gear combination, having an unequal number of gears relative to the first gear combination, causes the pump shaft to also rotate in the given direction and operate the pump. The pump thereby operates while the output shaft is rotated, regardless of direction. As the pump operates, lubricant is suctioned from a sump of the transmission into lubricant channels of the transmission to be distributed to components prone to friction, such as clutches of the transmission.

In this way, components of a vehicle transmission may be lubricated during vehicle modes where the components are in motion without being actively propelled by a prime mover. By arranging two gear combinations in parallel with one another, the two gear combinations extending between an output shaft of the transmission and a pump shaft of a pump, the two gear combinations may communicate rotation of the output shaft to rotation of the pump shaft. The two gear combinations include clutches that lock in opposite rotational directions, which allows one of the gear combinations to drive rotation of the pump shaft during forward rotation of the output shaft and the other of the gear combinations to drive rotation of the pump shaft during reverse rotation of the output shaft. By configuring the gear combinations with unequal numbers of the gears, the pump shaft is rotated in the same direction regardless of rotation of the output shaft. As a result, a variety of pumps types may be utilized, including uni-directional pumps, and transmission components may be lubricated during, for example, towing operations via a low cost and efficient strategy.

The technical effect of the pump assembly described herein is to allow the pump to be operated regardless of the rotational direction of the output shaft when the prime mover of the vehicle is not engaging the output shaft.

The disclosure also provides support for a mechanical system in a transmission of a vehicle, comprising: a first gear combination including a first one-way clutch rotationally coupled to an output shaft and to a pump shaft, and a second gear combination including a second one-way clutch that is arranged parallel to the first gear combination, the second gear combination also rotationally coupled to the output shaft and to the pump shaft, wherein the first and second gear combinations have an unequal number of gears. In a first example of the system, the first one-way clutch is configured to drive rotation of the pump shaft when the output shaft rotates in a first direction corresponding to forward towing of the vehicle, and wherein the second one-way clutch freewheels when the output shaft rotates in the first direction. In a second example of the system, optionally including the first example, the second one-way clutch drives rotation of the pump shaft when the output shaft rotates in a second direction corresponding to reverse towing of the vehicle, and wherein the first one-way clutch freewheels when the output shaft rotates in the second direction. In a third example of the system, optionally including one or both of the first and second examples, the pump shaft rotates in a fixed direction whether the output shaft rotates in the first direction or the second direction. In a fourth example of the system, optionally including one or more or each of the first through third examples, rotation of the pump shaft operates a pump drawing a lubricant from a sump of the transmission into lubricant channels of the transmission. In a fifth example of the system, optionally including one or more or each of the first through fourth examples, friction clutches of the transmission are lubricated when the pump shaft is rotated. In a sixth example of the system, optionally including one or more or each of the first through fifth examples, the system further comprises: a power take-off assembly coupled to the output shaft or a prime mover shaft of the vehicle, the power take-off assembly including two mechanical branches each with at least a one-way clutch of a plurality of a plurality of one-way clutches configured to engage with the output shaft or the prime mover shaft in opposite rotational directions. In a seventh example of the system, optionally including one or more or each of the first through sixth examples, the pump shaft drives operation of a uni-directional pump. In an eighth example of the system, optionally including one or more or each of the first through seventh examples, the mechanical system compels rotation of the pump shaft when rotation of the output shaft is not driven by a prime mover of the vehicle. The disclosure also provides support for a method for a transmission, comprising, transferring rotation of an output shaft of the transmission to a pump assembly, wherein the rotation of the output shaft is not driven by a prime mover, the pump assembly including a first one-way clutch included in a first gear combination and a second one-way clutch included in a second gear combination, and wherein the first gear combination and the second gear combination include different numbers of gears. In a first example of the method, transferring the rotation of the output shaft to the pump assembly includes rotating a pump shaft of the pump assembly in a fixed rotational direction, and wherein the rotation of the output shaft includes rotating the output shaft in a first rotational direction and a second, opposite rotational direction. In a second example of the method, optionally including the first example, the method further comprises engaging the first one-way clutch with the output shaft when the output shaft is rotated in a first rotational direction with the second one-way clutch disengaged from the output shaft, and wherein the second one-way clutch engages with the output shaft when the output shaft is rotated in a second rotational direction, opposite of the first rotational direction, with the first one-way clutch disengaged from the output shaft. In a third example of the method, optionally including one or both of the first and second examples, the output shaft is extended relative to another output shaft of the transmission not coupled to the pump assembly. In a fourth example of the method, optionally including one or more or each of the first through third examples, output shaft is rotated as a vehicle having the transmission is towed. In a fifth example of the method, optionally including one or more or each of the first through fourth examples, a pump shaft of the pump assembly is rotated in a same direction whether the vehicle is towed in a forward drive direction or a reverse drive direction. The disclosure also provides support for a driveline system for a vehicle, comprising: a power take-off assembly coupled to a prime mover shaft or an output shaft via a parallel set of mechanical branches configured to engage with the prime mover shaft or the output shaft in opposite directions, and a pump assembly coupling the output shaft to a pump shaft, the pump assembly including a first gear combination with a first one-way clutch and a second gear combination with a second one-way clutch, the first and the second one-way clutches configured to lock in opposite rotational directions. In a first example of the system, the parallel set of mechanical branches includes a third one-way clutch and a fourth one-way clutch, each coupled to the prime mover shaft or the output shaft. In a second example of the system, optionally including the first example, each of the parallel set of mechanical branches has a different number of gears. In a third example of the system, optionally including one or both of the first and second examples, the power take-off assembly transfers mechanical power from the prime mover shaft or the output shaft to a power take-off device. In a fourth example of the system, optionally including one or more or each of the first through third examples, the system further comprises: a disconnect system arranged between gears of the first and second gear combinations and the pump shaft to disconnect the first and second gear combinations from the pump shaft when the vehicle is propelled by a prime mover.

FIGS. 1-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such. Even further, elements which are coaxial or parallel to one another may be referred to as such. Still further, an axis about which a component rotates may be referred to as a rotational axis.

Note that the example control and estimation routines included herein can be used with various powertrain, electric drive, and/or vehicle system configurations. The control methods and routines disclosed herein may be stored as executable instructions in non-transitory memory and may be carried out by the control system including the controller in combination with the various sensors, actuators, and other transmission and/or vehicle hardware in combination with the electronic controller. As such, the described actions, operations, and/or functions may graphically represent code to be programmed into non-transitory memory of the computer readable storage medium in the vehicle and/or driveline control system. The various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of prime movers, internal combustion engines, and/or transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A mechanical system in a transmission of a vehicle, comprising:
    a first gear combination including a first one-way clutch rotationally coupled to an output shaft and to a pump shaft; and
    a second gear combination including a second one-way clutch that is arranged parallel to the first gear combination, the second gear combination also rotationally coupled to the output shaft and to the pump shaft;
    wherein the first and second gear combinations have an unequal number of gears.

2. The mechanical system of claim 1, wherein the first one-way clutch is configured to drive rotation of the pump shaft when the output shaft rotates in a first direction corresponding to forward towing of the vehicle, and wherein the second one-way clutch freewheels when the output shaft rotates in the first direction.

3. The mechanical system of claim 2, wherein the second one-way clutch drives rotation of the pump shaft when the output shaft rotates in a second direction corresponding to reverse towing of the vehicle, and wherein the first one-way clutch freewheels when the output shaft rotates in the second direction.

4. The mechanical system of claim 3, wherein the pump shaft rotates in a fixed direction whether the output shaft rotates in the first direction or the second direction.

5. The mechanical system of claim 1, wherein rotation of the pump shaft operates a pump drawing a lubricant from a sump of the transmission into lubricant channels of the transmission.

6. The mechanical system of claim 1, wherein friction clutches of the transmission are lubricated when the pump shaft is rotated.

7. The mechanical system of claim 1, further comprising a power take-off assembly coupled to the output shaft or a prime mover shaft of the vehicle, the power take-off assembly including two mechanical branches each with at least a one-way clutch of a plurality of one-way clutches configured to engage with the output shaft or the prime mover shaft in opposite rotational directions.

8. The mechanical system of claim 1, wherein the pump shaft drives operation of a uni-directional pump.

9. The mechanical system of claim 1, wherein the mechanical system compels rotation of the pump shaft when rotation of the output shaft is not driven by a prime mover of the vehicle.

10. A method for a transmission, comprising;
    transferring rotation of an output shaft of the transmission to a pump assembly, wherein the rotation of the output shaft is not driven by a prime mover, the pump assembly including a first one-way clutch included in a first gear combination and a second one-way clutch included in a second gear combination, and wherein the first gear combination and the second gear combination include different numbers of gears.

11. The method of claim 10, wherein transferring the rotation of the output shaft to the pump assembly includes rotating a pump shaft of the pump assembly in a fixed rotational direction, and wherein the rotation of the output shaft includes rotating the output shaft in a first rotational direction and a second, opposite rotational direction.

12. The method of claim 10, wherein the method further comprises engaging the first one-way clutch with the output shaft when the output shaft is rotated in a first rotational direction with the second one-way clutch disengaged from the output shaft, and wherein the second one-way clutch engages with the output shaft when the output shaft is rotated in a second rotational direction, opposite of the first rotational direction, with the first one-way clutch disengaged from the output shaft.

13. The method of claim 10, wherein the output shaft is extended relative to another output shaft of the transmission not coupled to the pump assembly.

14. The method of claim 10, wherein the output shaft is rotated as a vehicle having the transmission is towed.

15. The method of claim 14, wherein a pump shaft of the pump assembly is rotated in a same direction whether the vehicle is towed in a forward drive direction or a reverse drive direction.

16. A driveline system for a vehicle, comprising:
a power take-off assembly coupled to a prime mover shaft or an output shaft via a parallel set of mechanical branches configured to engage with the prime mover shaft or the output shaft in opposite directions; and
a pump assembly coupling the output shaft to a pump shaft, the pump assembly including a first gear combination with a first one-way clutch and a second gear combination with a second one-way clutch, the first and the second one-way clutches configured to lock in opposite rotational directions.

17. The driveline system of claim 16, wherein the parallel set of mechanical branches includes a third one-way clutch and a fourth one-way clutch, each coupled to the prime mover shaft or the output shaft.

18. The driveline system of claim 16, wherein each of the parallel set of mechanical branches has a different number of gears.

19. The driveline system of claim 16, wherein the power take-off assembly transfers mechanical power from the prime mover shaft or the output shaft to a power take-off device.

20. The driveline system of claim 16, further comprising a disconnect system arranged between gears of the first and second gear combinations and the pump shaft to disconnect the first and second gear combinations from the pump shaft when the vehicle is propelled by a prime mover.

* * * * *